T. F. PAYNE.
PUDDLING IRON.
APPLICATION FILED APR. 30, 1919.
1,342,694.
Patented June 8, 1920.
6 SHEETS—SHEET 2.
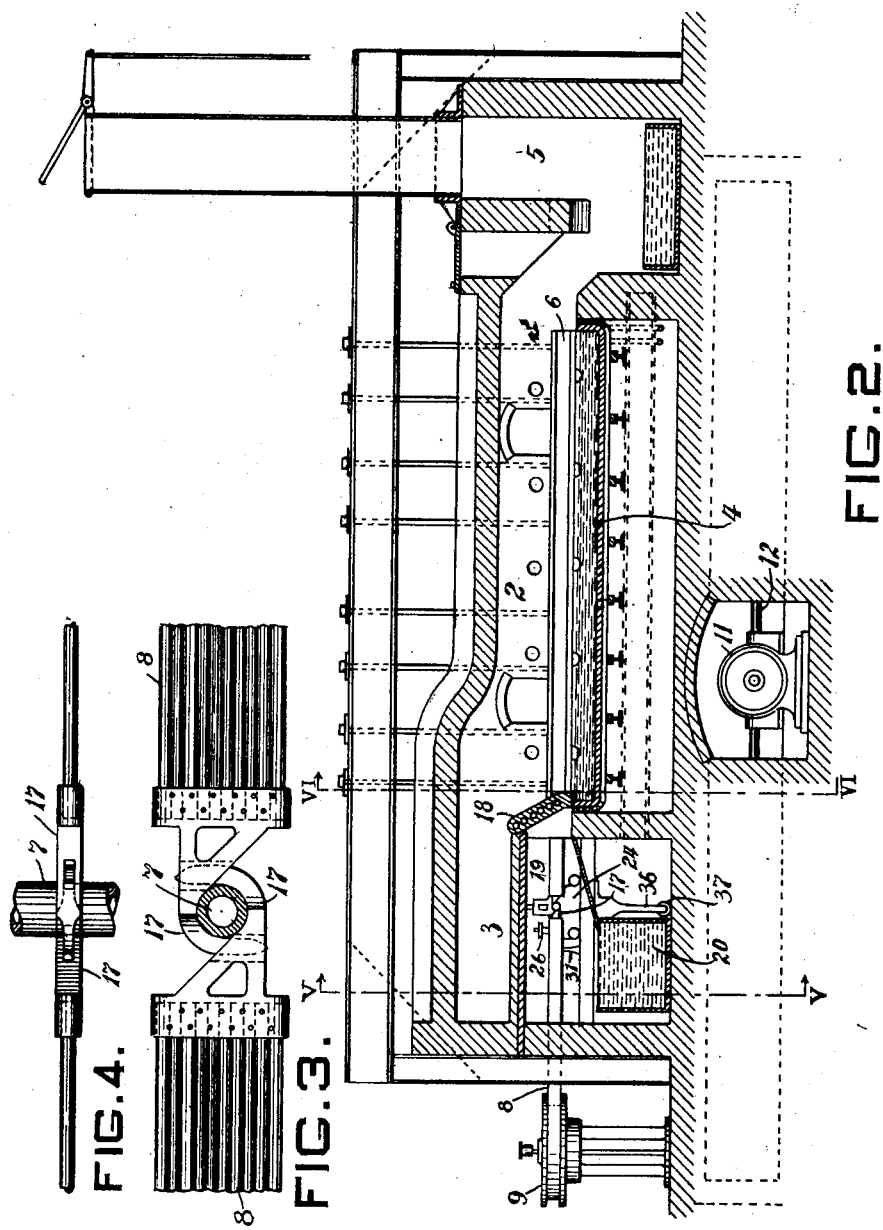
INVENTOR T. F. PAYNE.
PUDDLING IRON.
APPLICATION FILED APR. 30, 1919.
1,342,694.
Patented June 8, 1920.
6 SHEETS—SHEET 3.
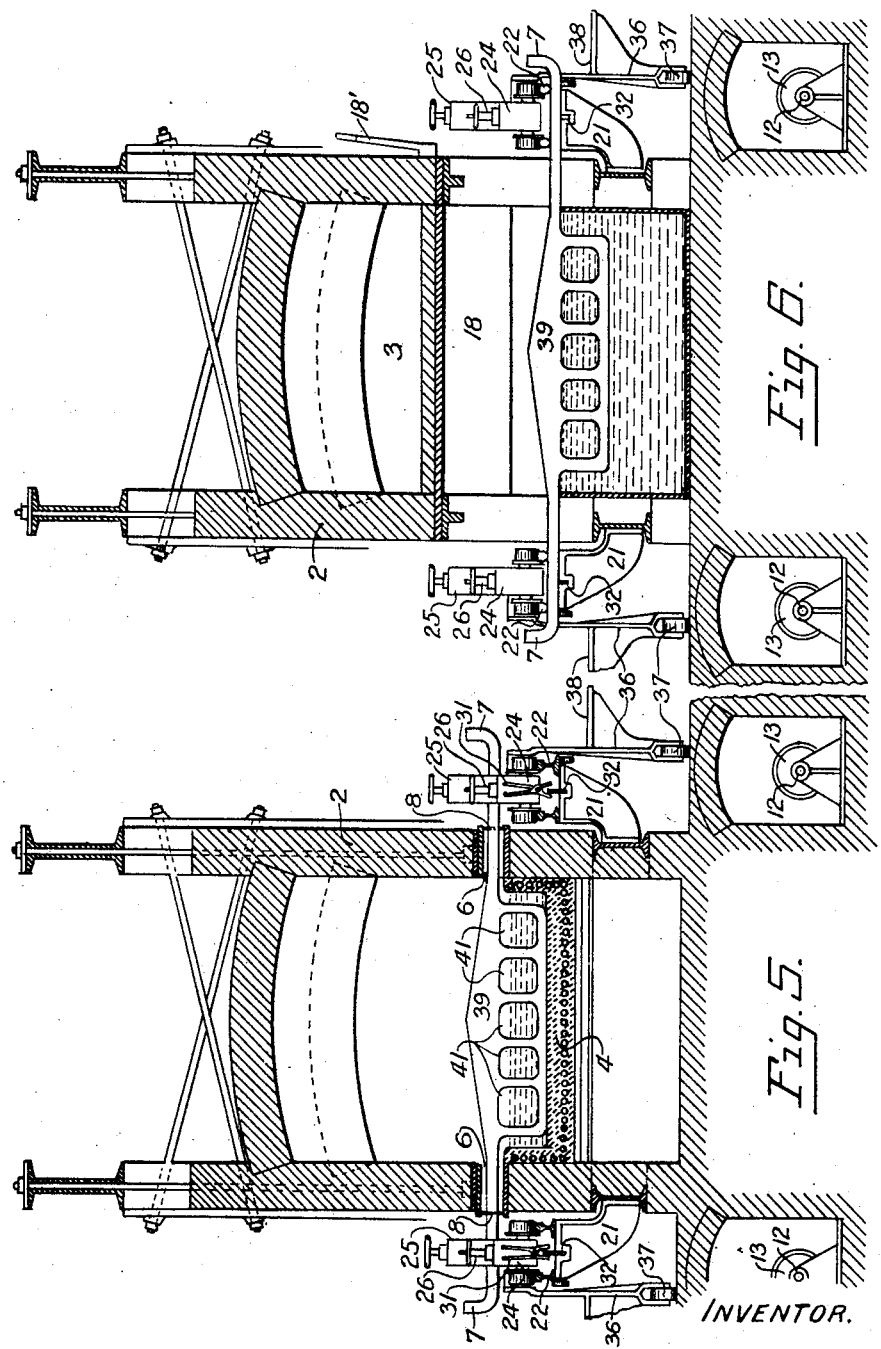

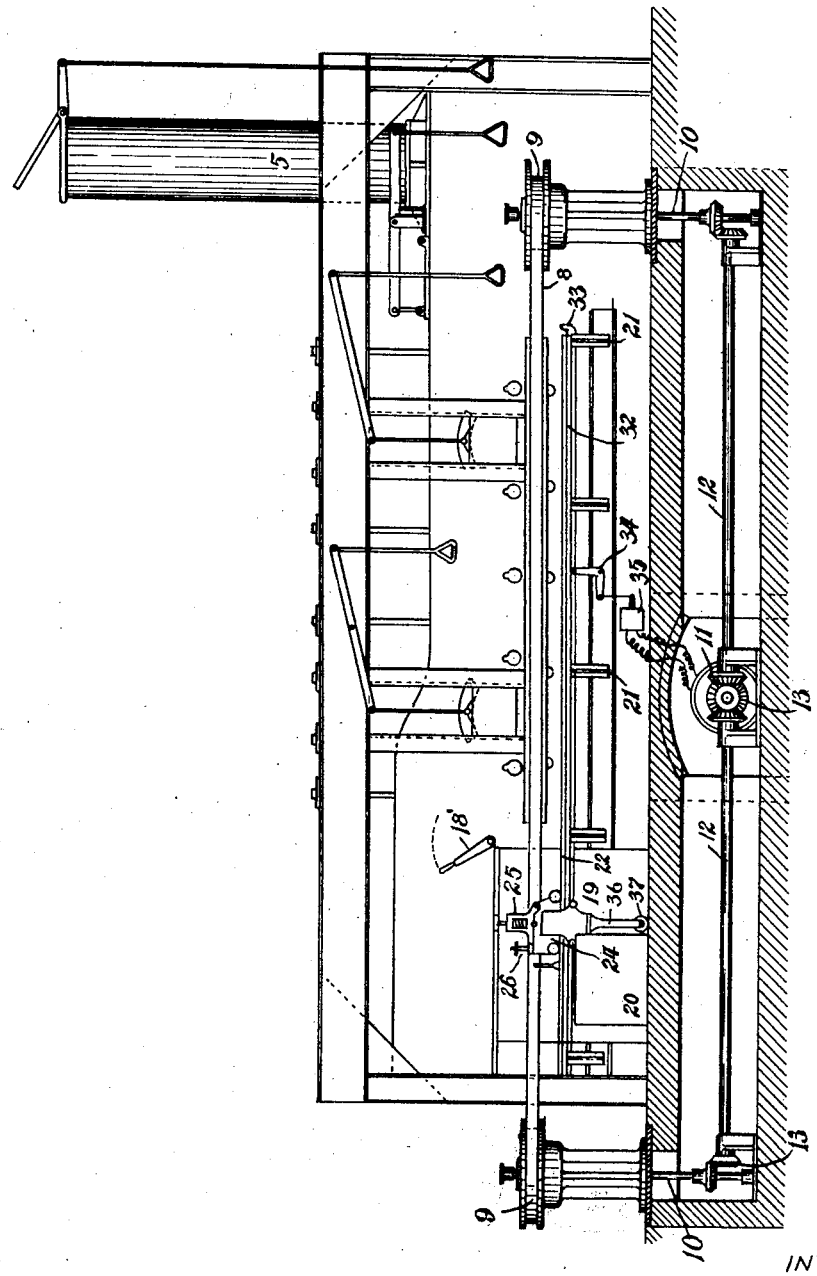

T. F. PAYNE.
PUDDLING IRON.
APPLICATION FILED APR. 30, 1919.

1,342,694.

Patented June 8, 1920.
6 SHEETS—SHEET 4.

INVENTOR
Thomas F. Payne
by James K. Bakewell
his attorney

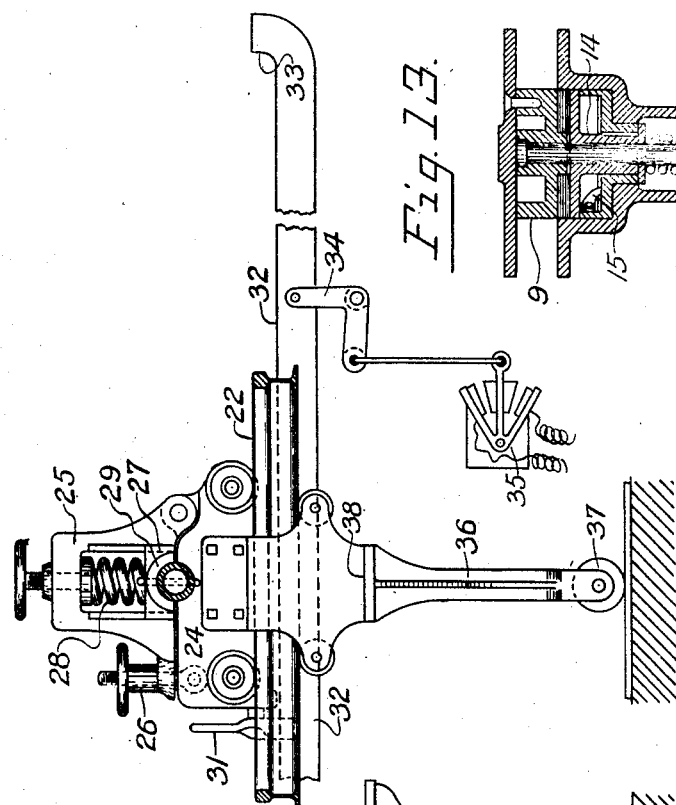

T. F. PAYNE.
PUDDLING IRON.
APPLICATION FILED APR. 30, 1919.
1,342,694.
Patented June 8, 1920.
6 SHEETS—SHEET 6.
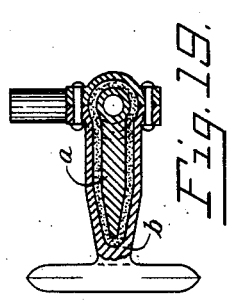
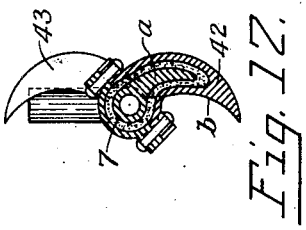
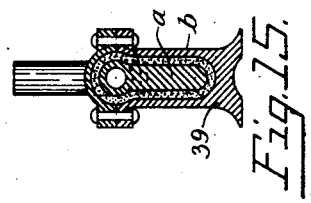
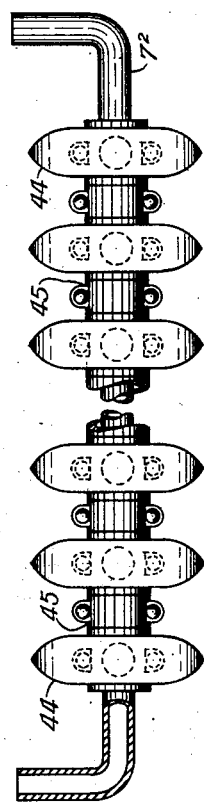
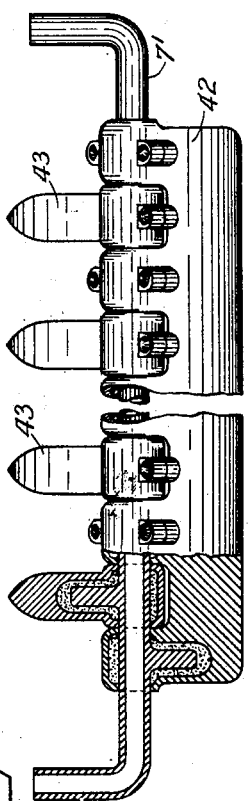
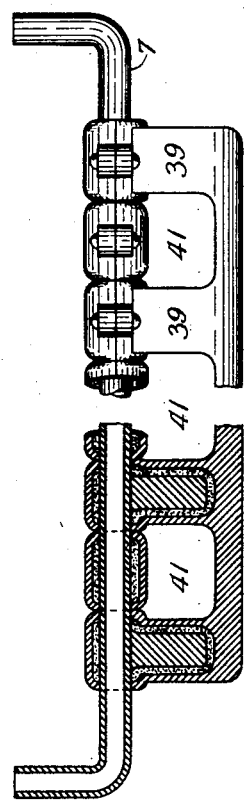
INVENTOR.
Thomas F. Payne
by James K. Bakewell
his attorney

UNITED STATES PATENT OFFICE.

THOMAS F. PAYNE, OF PITTSBURGH, PENNSYLVANIA.

PUDDLING IRON.

1,342,694.      Specification of Letters Patent.      Patented June 8, 1920.

Application filed April 30, 1919. Serial No. 293,611.

*To all whom it may concern:*

Be it known that I, THOMAS F. PAYNE, master mechanic, of the city of Pittsburgh, in the county of Allegheny and State of Pennsylvania, a citizen of the United States of America, have invented a new and useful Improvement in Puddling Iron, of which the following is a full, clear, and exact description.

My invention relates to the manufacture of wrought iron by what is known as the puddling process, in which pig iron, the product of the blast furnace, is, when in a molten condition, subjected to heat until so much of the carbon has been removed that the metal loses its fluidity and assumes a pasty condition, in which condition it is poked, stirred and worked by the puddler, and finally made into balls which are removed from the furnace to be squeezed and rolled into billets or bars.

The usual method of this operation requires skilled labor, the working and balling of the metal being done by hand; and, as the amount of metal which a single man is capable of working is limited, the output of each furnace is small. Many kinds of devices have been invented for the purpose of doing the work mechanically but none of them have been sufficiently efficient to do away with the old hand practice. The purpose of my invention is to comb and agitate the metal in the puddling furnace in such a manner as to increase the fiber and to lessen the time and labor ordinarily required in the puddling process.

I will now describe my invention that others skilled in the art to which it appertains may employ the same, reference being had to the accompanying drawings, forming part of this specification, and illustrating my improved apparatus, which may be employed in my process in which—

Figure 8:
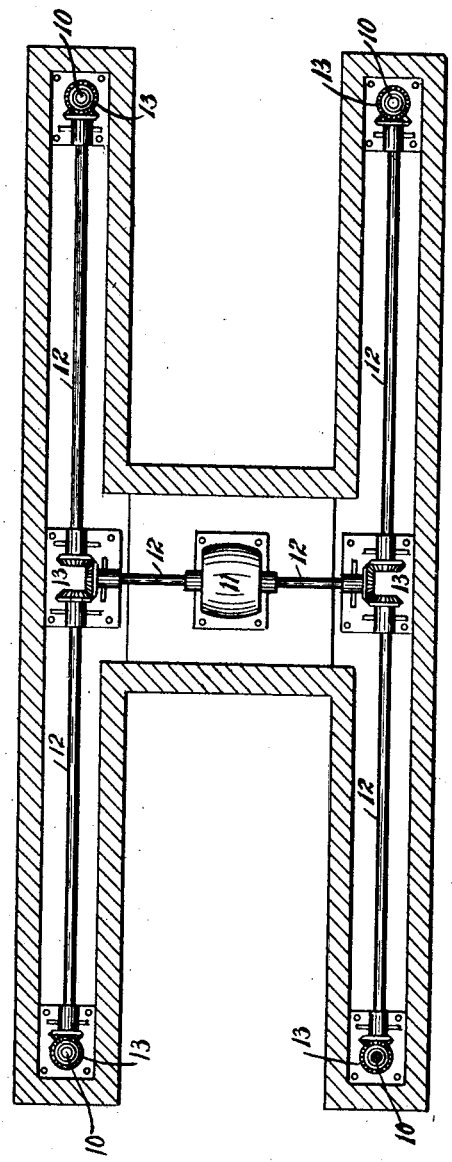
Figure 7:
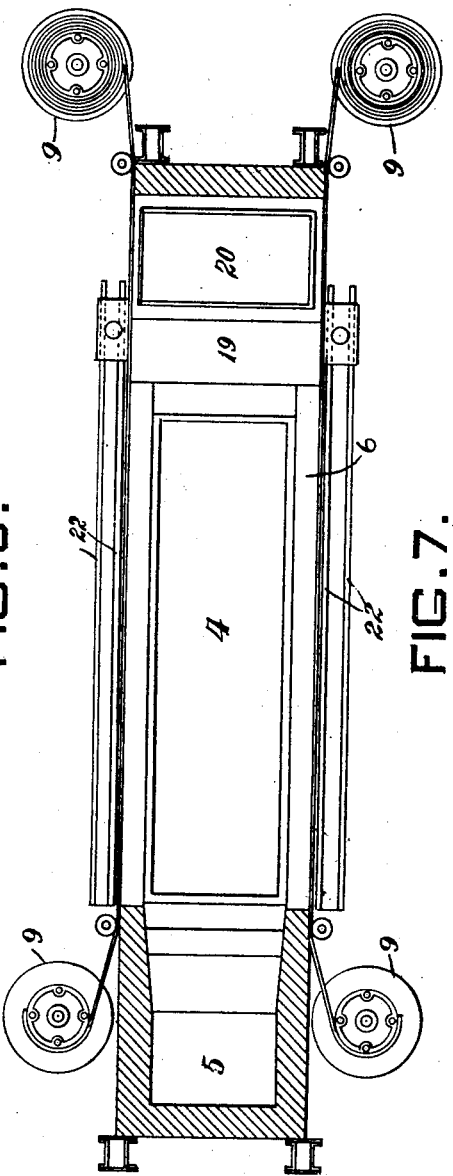

Figure 1 is a side elevation, partly in section, of a puddling furnace illustrating my invention; Fig. 2 is a longitudinal vertical sectional view of the same; Fig. 3 is a detached side elevation showing the hooks which secure the tools to the belt; Fig. 4 is a plan view of the same; Figs. 5 and 6 are vertical cross sectional views of the same; Figs. 7 and 8 are horizontal sectional views illustrating the power mechanism; Fig. 9 is a vertical view, partly in cross section, illustrating the tool carrying carriage as it is mounted on a track at the side of the furnace; Fig. 10 is a side elevation of the carriage and the starting and reversing mechanism; Fig. 11 is a detached side elevation of a portion of the movable apron that covers the slots in the sides of the furnace; Fig. 12 is a vertical cross sectional view of the same; Fig. 13 is a vertical sectional view of the spindle and drum on which the apron is wound; Fig. 14 is an elevation, partially in section, illustrating the rabbling tool; Fig. 15 is a vertical cross sectional view of the same; Fig. 16 is an elevation, partially in section, of the scooping and cutting tool; Fig. 17 is a vertical cross sectional view of the same; Fig. 18 is an elevation, partially in section, of the balling tool; and Fig. 19 is a vertical cross sectional view of the same.

In the drawing 2 represents a puddling furnace having a fire chamber 3 and a hearth 4, at the end of which hearth is the stack 5, beneath which may be the usual receptacle for water, the purpose of which is to collect the dust passing from the hearth. On each side of the furnace above the hearth is a longitudinal horizontal slot 6 through which the shaft 7 of the operating tools so passes as to permit the tools to be drawn longitudinally from one end of the hearth to the other. These slots are covered by a belt 8 which may be formed of wire rope and asbestos woven or secured by metal bands 16, into a fabric, the belts being wound on drum 9, at each end of the furnace, which drums are loosely mounted on vertical spindles 10 which are driven by the motor 11 through shafts 12 and miter wheels 13. Keyed to the spindles are sleeves 14 having pawls 15 which engage with the drum when the spindle rotates in one direction and slip on the same when the movement is reversed. This is to enable the belt to be wound and unwound on the drum in reverse directions. At the ends of the belt 8 are hooks 17 adapted to engage with the shafts 7 of the operating tools, the space about the shank of the hooks being open to permit the operator to observe the action of the tools on the iron on the hearth of the furnace.

Below the fire chamber 3 and between it and the puddling chamber of the furnace is a swinging door 18 which closes a door way into a cooling chamber 19 having a water tank 20 in which, or over which, the tools may be cooled as they pass out of the puddling chamber. This door 18 is supported by a metal bar which passes through the fire brick of the door and is attached at its outer end to an operating lever, 18', which is shown in Figs. 1 and 6 of the drawing.

Along the sides of the furnace below the slot 6 are brackets 21 on which are tracks 22 for the support of the traveling carriages 24 which carry the operating tools longitudinally in the furnace, the shafts 7 of the tools being clamped to the carriage by the hinged clamps 25, which clamps are secured in their closed position by the bolt and nut 26. Within the clamps 25 are vertically slidable blocks 27, bearing against springs 28, which permits the shaft of the tool to rise against the force of the spring should the tool meet an obstruction, and extending from these blocks are semi-circular flanges 29 which fit over the shaft of the tool and serve as seats for pins 30 which pass through eyes in the flanges and in the shaft of the tools to prevent the shaft from turning on its axis. Fixed to the carriages are pivoted tongs 31 adapted to grasp the slidable bar 32 which is mounted in slots in the brackets 21 and at their ends are provided with raised portions 33 adapted to engage with the carriages to move the bar longitudinally. Pivoted to the bar 32 is a ball crank lever 34, which is connected with the electrical switch 35, which is connected with the motor. By this arrangement the movement of the bar 32 serves to reverse the motor when the carriages reach the end of the track, or the motor may be stopped or reversed anywhere on the track by causing the tongs to grasp the bar 33. Secured to the carriages 24 are standards 36 having supporting rollers 37 and a seat 38 for the operator.

The tools are three in number; the rabbler, shown in Figs. 14 and 15, the scoop and cutter, shown in Figs. 16 and 17, and the balling tool, shown in Figs. 18 and 19. The rabbler consists of a plate 39, which is fixed to a tubular shaft 7, the plate having openings 41 through which the molten metal passes as the tool is moved from one end of the hearth of the furnace to the other. The scoop consists of a solid curved plate 42 fixed to the shaft 7, and the cutter or breaker consists of separated curved teeth 43 fixed to and extending from the opposite side of the same shaft. The balling tool consists of straight teeth 44 fixed to a shaft $7^2$, the teeth being separated from each other by collars 45. These tools are preferably formed in sections, having an inner metal core $a$, an outer metal facing $b$ and an intervening portion of clay or other heat resisting material. The purpose of this construction is to add to the life of the tools and to enable them to be repaired by replacing one of the parts.

The operation of my improved puddler is as follows: The hearth of the furnace having been prepared as is customary in puddling iron, pig iron is placed on the hearth and brought to a molten condition, (or molten cast iron may be placed on the hearth directly from a blast or cupola furnace) and the heat is continued until the carbon has been sufficiently removed from the iron to cause it to commence to lose its fluidity. The shaft 7 of the rabbling tool is then placed within the slots 6 on the carriages 24 to which it is secured by the clamp 25 and the pin 30. The hooks 17 of the belt 8 are engaged with the shaft 7 and by moving the bar 32 the motor is put in operation which winds the belts 8 on the drums 9 drawing the rabbling tool longitudinally through the molten metal, thus combing the metal from one end of the hearth to the other, the carriage 24 traveling with the tool. The motor is then reversed and the tool is carried back through the metal, and this operation is continued until the rabbling operation has been completed. The rabbling tool 39 is then removed from the carriage and the scoop 42 and cutter 43 is put in its place by means of which the metal is worked, combed and broken into a pasty mass, the tool being carried back and forth in the manner described, and the cutters being substituted for the scoop by removing the pins 30 and giving the shaft 7 a half turn on its axis after the metal has been sufficiently worked. The balling tool 44 is thus put in place of the scoop, and by the movement of this tool the metal is formed into rolls or balls which may be removed from the furnace and taken to the squeezer in the usual manner.

If during the use of these tools they should become too hot they may be run into the cooling chamber 19 to be cooled by a spray of water or by immersion in the tank 20.

From the foregoing description the advantages of my invention may be appreciated by those skilled in the art.

Having thus described my invention, which is substantially the same as that described in my prior abandoned applications, Serial Nos. 186,879 and 186,880, filed October 18, 1917, and allowed December 13, 1917, and March 16, 1918, what I claim and desire to secure by Letters Patent is—

1. The method of puddling iron consisting in agitating the metal in the furnace on horizontal longitudinal parallel lines, thereby producing a combing or stratifying action.

2. The method of puddling iron consisting in reciprocatingly combing the molten metal in the furnace on horizontal longitudinal parallel lines to produce a fibrous stratification therein, and rolling or balling the metal longitudinally.

3. In a mechanical puddler a furnace having longitudinal slots in the side walls thereof, in combination with a tool, devices for drawing the tool longitudinally back and forth in the furnace, the tool dipping into the metal in the furnace during the movements in each direction, and a movable curtain adapted to keep the slots covered.

4. In a mechanical puddler a furnace having longitudinal slots in the side walls thereof, in combination with a tool, devices for drawing the tool longitudinally back and forth in the furnace, the tool dipping into the metal in the furnace during the movements in each direction, and a traveling belt adapted to keep the slots covered.

5. In a mechanical puddler, a furnace having longitudinal slots at the sides thereof, a traveling belt adapted to keep the slots covered, a tool adapted to be drawn longitudinally through the metal in the furnace, and a carriage adapted to support the tool and to travel with a belt.

6. In a mechanical puddler, a furnace having longitudinal slots at the sides thereof, and a movable door at one end, a traveling belt adapted to cover the slot, and a tool adapted to be drawn longitudinal through the furnace.

7. In a mechanical puddler, a furnace having longitudinal slots at the sides thereof, a movable door at one end, movable curtains adapted to cover the slots, a tool adapted to be reciprocated longitudinally through the furnace, and devices located at the end of the furnace for cooling the tool.

In testimony whereof, I have hereunto set my hand.

THOMAS F. PAYNE.

Witnesses:
JAMES K. BAKEWELL,
A. M. GOODWIN.